United States Patent US 11,341,104 B1
Prabhakaran et al.    Date of Patent: May 24, 2022

(54) IN PLACE RESIZE OF A DISTRIBUTED DATABASE

(71) Applicants: Vijayan Prabhakaran, Los Gatos, CA (US); Rajesh Parangi Sharabhalingappa, Santa Clara, CA (US); Sanuj Basu, Foster City, CA (US); Gokul Soundararajan, San Jose, CA (US); Krishna Chaitanya Gudipati, Fremont, CA (US); Aditya Subrahmanyan, Mountain View, CA (US)

(72) Inventors: Vijayan Prabhakaran, Los Gatos, CA (US); Rajesh Parangi Sharabhalingappa, Santa Clara, CA (US); Sanuj Basu, Foster City, CA (US); Gokul Soundararajan, San Jose, CA (US); Krishna Chaitanya Gudipati, Fremont, CA (US); Aditya Subrahmanyan, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 302 days.

(21) Appl. No.: 16/360,800

(22) Filed: Mar. 21, 2019

(51) Int. Cl.
G06F 16/22 (2019.01)
G06F 16/21 (2019.01)
H04L 67/1097 (2022.01)
G06F 11/14 (2006.01)
G06F 16/27 (2019.01)

(52) U.S. Cl.
CPC ........ *G06F 16/214* (2019.01); *G06F 11/1464* (2013.01); *G06F 16/2282* (2019.01); *G06F 16/27* (2019.01); *H04L 67/1097* (2013.01); *G06F 2201/80* (2013.01)

(58) Field of Classification Search
CPC .... G06F 16/217; G06F 16/278; G06F 16/284; G06F 16/214; G06F 16/27; G06F 16/2282; G06F 11/1464; G06F 2201/80; H04L 67/1097
See application file for complete search history.

(56) References Cited

U.S. PATENT DOCUMENTS 6,691,166 B1 * 2/2004 Gasior .................... H04L 29/06 709/232
9,262,494 B2 * 2/2016 Konersmann ......... G06F 16/254
9,613,120 B1 * 4/2017 Kharatishvili .......... G06F 16/23
(Continued)

*Primary Examiner* — Merilyn P Nguyen
(74) *Attorney, Agent, or Firm* — Nicholson De Vos Webster & Elliott LLP

(57) ABSTRACT

Techniques for resizing a distributed database are described. A request to resize a distributed database is received. The distributed database stores data organized into one or more rows of one or more tables. Each node of the first plurality of nodes is assigned a portion of the data. A portion of the data assigned to a first node in the first plurality of nodes is selected to be assigned to a second node in a second plurality of nodes. The number of nodes in the first and second plurality of nodes is different, and the first and second plurality of nodes include at least one common node. Metadata of the selected portion of the data is transferred from the first node to the second node. The metadata that includes a location of the selected portion of the data within a provider network.

19 Claims, 10 Drawing Sheets

(56) References Cited

U.S. PATENT DOCUMENTS

| | | | |
|---|---|---|---|
| 10,652,248 B2* | 5/2020 | Maycotte | G06F 21/6218 |
| 2012/0158650 A1* | 6/2012 | Andre | G06F 16/24539 |
| | | | 707/611 |
| 2013/0159366 A1* | 6/2013 | Lyle | G06F 16/1834 |
| | | | 707/827 |
| 2014/0156596 A1* | 6/2014 | Chandra | G06F 16/27 |
| | | | 707/634 |
| 2014/0372491 A1* | 12/2014 | Ross | H04L 67/1097 |
| | | | 707/822 |
| 2015/0120658 A1* | 4/2015 | Rath | G06F 16/27 |
| | | | 707/623 |
| 2016/0350775 A1* | 12/2016 | Turner | G06F 16/2455 |
| 2020/0380344 A1* | 12/2020 | Lie | G06N 3/063 |

* cited by examiner

IN PLACE RESIZE OF A DISTRIBUTED DATABASE

BACKGROUND

To improve database performance, a database can be distributed amongst multiple computing resources. Such distributed databases allow for queries to be executed in parallel by the computing resources. Since each computing resource is handling a smaller amount of data than the entirety of the database, the computing resources can generate and return results faster than if a single computing resource had to execute a query against the entire database.

BRIEF DESCRIPTION OF DRAWINGS

Various embodiments in accordance with the present disclosure will be described with reference to the following drawings.

DETAILED DESCRIPTION

Figure 1:
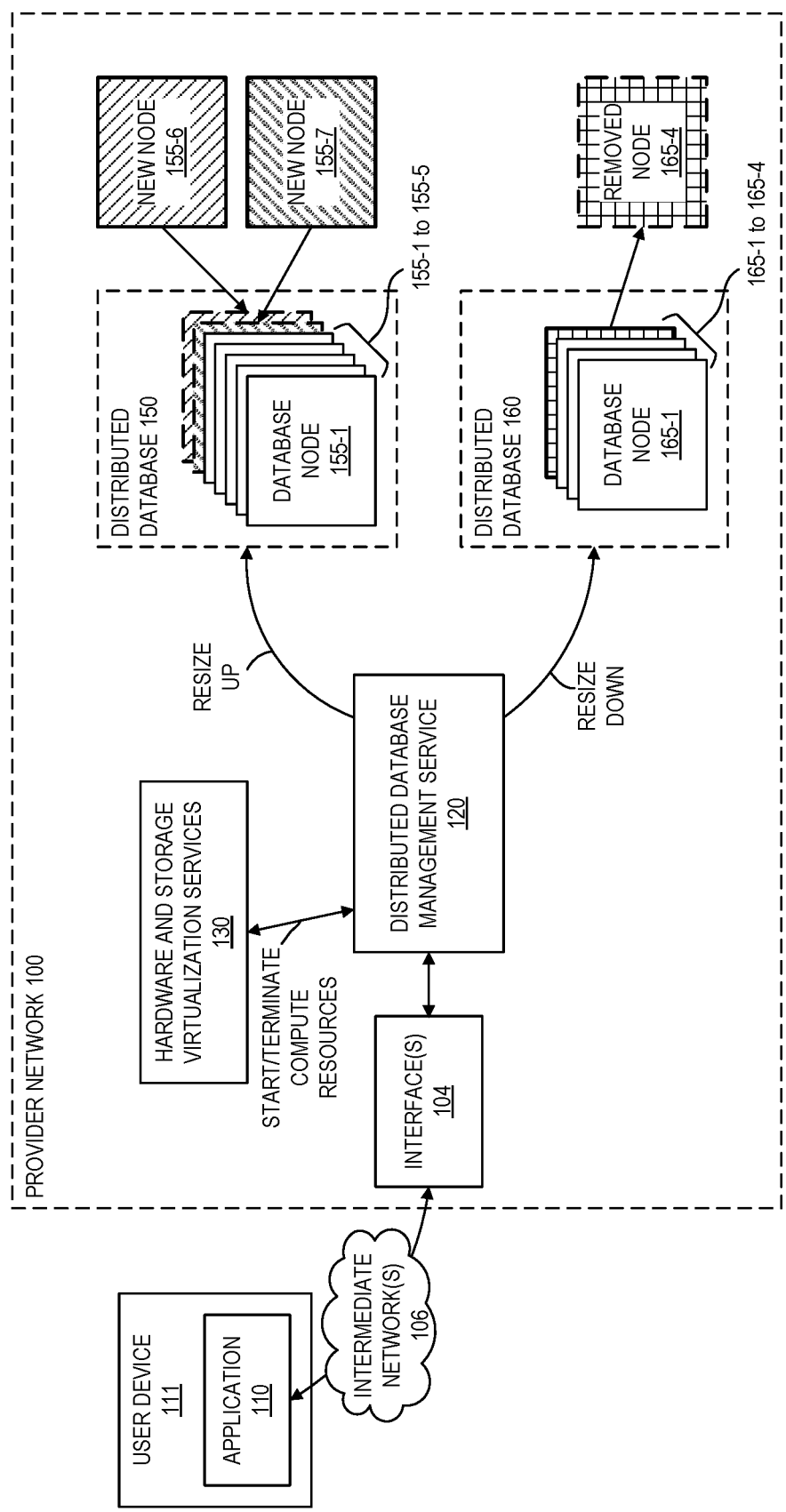
FIG. 1 is a diagram illustrating an environment for resizing a distributed database according to some embodiments.

The requirements for a given distributed database can change over time. For example, as data is added to the database, each computing resource of the distributed database has to run queries against a larger amount of data, which can slow the response time of the database and could lead to service interruptions or delays. As another example, the query load on the database can vary with time. The database could handle an increase in the number of queries during the week relative to weekends. If the distributed database is sized to handle peak, weekday loading, a large amount of overhead capacity might go unused during off-peak times.

Changing the size or scope of a distributed database to respond to these dynamic demands traditionally involved creating an entirely new distributed database and then copying the data from the improperly sized distributed database to the new database. Depending on the amount of data to be copied, the delay associated with the transfer can cause significant downtime. Further, the copying of the data can interrupt or delay access to the original database by placing increased loading placed on the computing resources hosting the database and limit the ability to write or make changes to data in the database. As a result, the ability of the database administrator to respond to changes in demand was limited: either delay changing the distributed database until users experience performance loss or subject users to more frequent outages as the data in the database is copied to a new database.

Various embodiments of methods, apparatus, systems, and non-transitory computer-readable storage media for resizing a distributed database are described. According to some embodiments, data of a distributed databases is spread amongst a group of nodes where each node has some amount of processing and memory capacity. One of the nodes is deemed a leader or master node while the remaining nodes are treated as compute or slave nodes. A resize request adds or removes one or more compute nodes from the group. By resizing the distributed database while continuing to use some number of existing nodes within the group, the amount of downtime associated with changing the size of the database is dramatically reduced. In particular, apart from changes in data assignments dictated by the addition or removal of a node, the data of the database can remain in-place and associated with the compute nodes that are part of the distributed database before and after resizing.

According to some embodiments, techniques for the distribution of data amongst compute nodes and the selection of data for migration between compute nodes preserves the ability of a single compute node to perform co-located table joins rather than executing separate queries on multiple compute nodes and aggregating the results in a join.

According to some embodiments, the data transferred as part of a resize operation is limited to metadata that describes the location of the data in the database. As a result, the resize operation can be completed within a relatively short amount of time relative to traditional approaches involving full data copies. Further, the compute nodes that remain in the group of nodes hosting the database after the resize can begin servicing requests immediately while loading the data identified by the metadata in the background. By limiting the downtime of the database, in-process operations and operations directed to the database during the resize can be queued and resumed once the resize operation completes.

FIG. 1 is a diagram illustrating an environment for resizing a distributed database according to some embodiments. As illustrated, distributed databases 150 and 160 are hosted within a provider network 100. A provider network 100 provides users or customers with a variety of computing-related resources to reduce costs associated with information technology infrastructure and management. Distributed databases are one of a variety of types of services or resources that a provider can offer to customers where the provider maintains the underlying infrastructure and customers lease or rent capacity of the infrastructure. In addition to distributed databases, the provider network 100 provides a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

The users (or "customers") of provider networks 100 may utilize one or more user accounts that are associated with a customer account, though these terms may be used somewhat interchangeably depending upon the context of use. Users may interact with a provider network 100 from their device 111 across one or more intermediate networks 106 (e.g., the internet) via one or more interface(s) 104. An application executed by the user device 111 communicates with the interface(s) 105, such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved). The control plane or control plane services can leverage a backend service, such as hardware and/or storage virtualization services 130, to launch virtualized computing-related resources that can execute compute instances, store data objects, etc.

In the case of a distributed database, the provider network 100 includes a distributed database management service 120, which can be considered a backend service. In addition to creating and deleting distributed databases, customers may issue requests to resize existing distributed databases to the distributed database management service 120. As used herein, a distributed database is a database where the contained data is divided amongst multiple computing resources or nodes. The database may be a flat-file database, relational (e.g., Structured Query Language (SQL)) or non-relational (e.g., NoSQL), key-value store, etc. For example, a customer may host a distributed database 150 in the provider network 100, the distributed database 150 having five nodes 155-1 through 155-5. The customer can submit a request via a management console presented via a web page to perform a resize of the distributed database 150 to the distributed database management service 120. The resize request can specify the distributed database 150 is to be increased in size by two nodes. In response to the request, the distributed database management service 120 can launch two new nodes 155-6 and 155-7 (as indicated by the diagonal hatching) via the hardware and storage virtualization services 130. The distributed database management service 120 can then identify the new nodes to the distributed database 150 and instruct the distributed database 150 to resize to seven nodes, 155-1 through 155-7.

As another example, a customer may host a distributed database 160 in the provider network 100, the distributed database 160 having four nodes 165-1 through 165-4. The customer can submit a request via a management console presented via a web page to perform a resize of the distributed database 150 to the distributed database management service 120. The resize request can specify the distributed database 150 is to be decreased in size by one node. In response to the request, the distributed database management service 120 can instruct the distributed database 160 to resize to three nodes 155-1 through 155-3. One of the nodes can identify a node to be removed based on a policy, as described herein. In this case, node 165-4 is identified for removal (as indicated by the grid hatching). Once the resize has completed, the removed node 165-4 can be terminated via the hardware and storage virtualization services 130.

Additional details regarding the resize operations carried out by the distributed database management service 120 and distributed database itself are described below with reference to FIGS. 2-5. Although distributed databases 150, 160 are illustrated as hosted within the provider network 100, the techniques described herein are also applicable to on-premise distributed databases that are owned and managed by users or businesses.

Figure 2:
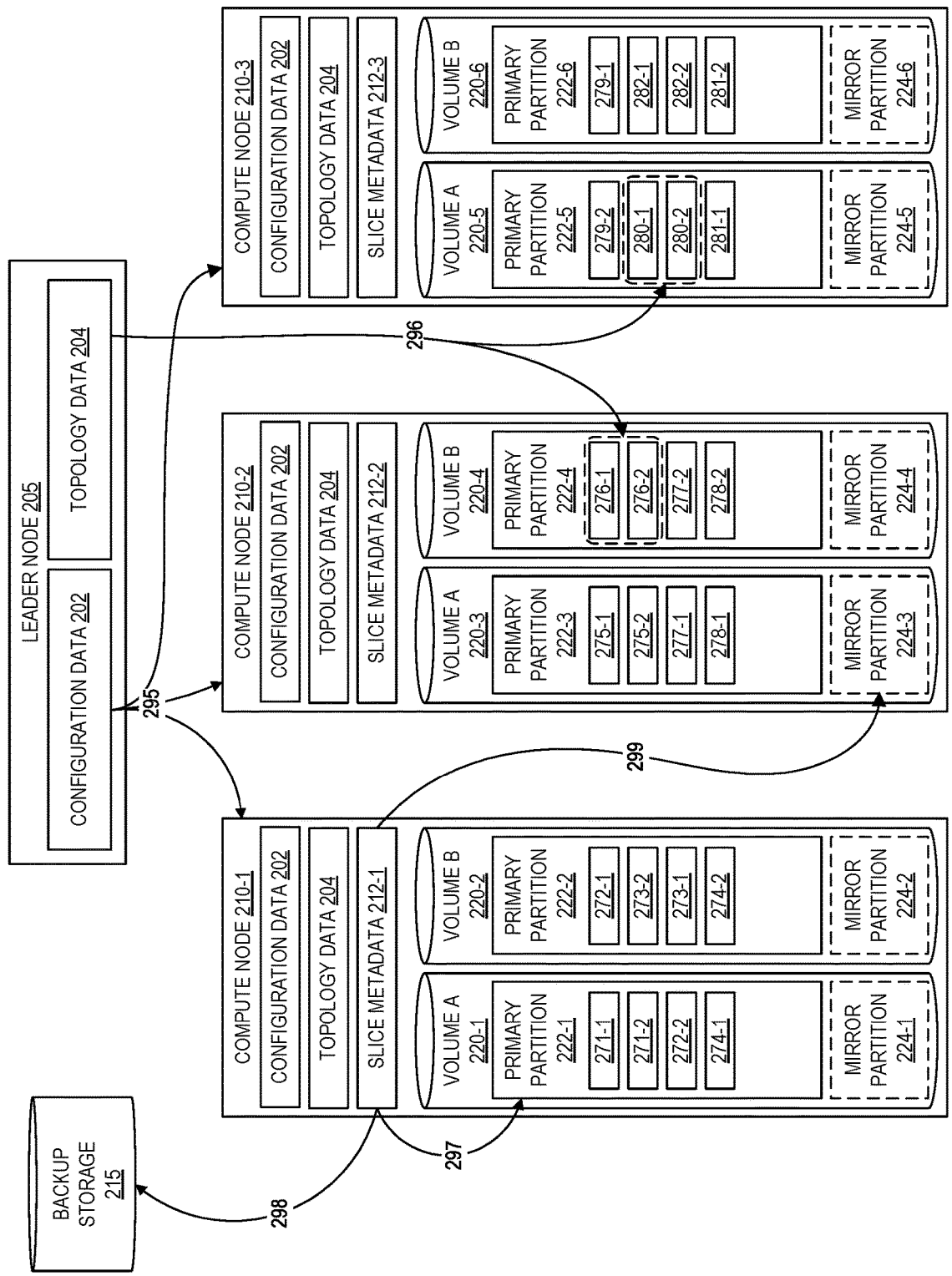
FIG. 2 is a diagram illustrating a distributed database architecture according to some embodiments.

FIG. 2 is a diagram illustrating a distributed database architecture according to some embodiments. In this example, the illustrated distributed database architecture includes a leader node 205 and one or more compute nodes 210. The leader node coordinates execution of queries on the compute nodes, and the compute nodes process queries against some assigned portion of the database. The leader node receives queries from external sources or requestors. Based on the data distribution amongst the compute nodes, the leader node queries one or more of the compute nodes. The compute nodes return query responses, which the leader may aggregate so as to provide the appropriate response to the requestor.

Although not shown, each node includes instructions executed by a processor, which may be a virtualized processor, that can access a memory device, such as a random-access memory, and a communications interface, such as an Ethernet adapter or communications bus, to communicate with the other nodes. The node may be hosted by a compute instance such as a virtual machine a container, as described elsewhere herein. In the case of the compute nodes 210, each compute node has access to one or more storage volumes. As shown, each compute node 210 has access to two storage volumes, locally referenced within the node as A and B. In particular, compute node 210-1 has access to volume A 220-1 and B 220-2, compute node 210-2 has access to volume A 220-3 and B 220-4, and compute node 210-3 has access to volumes A 220-5 and B 220-6. Volumes 220 may be accessible by the compute nodes 210 as locally attached storage or network-attached storage. For example, a locally attached storage device, such as a solid-state drive or a magnetic disk drive, may be locally attached to the processors of compute nodes 210 via a high-speed bus, such as a PCI Express, Serial ATA, or other high-speed bus. As another example, a network attached storage device may be attached to the processors of the compute nodes 210 via a network interface (not shown) to, for example, an Ethernet-based network. The various data and metadata, described below, can be stored in the memory or, in some embodiments, stored in an attached volume.

The configuration of the distributed database is defined in configuration data 202, which may be generated by the distributed database management service 120. The configuration data 202 includes identifications 295 of each of the nodes in the distributed database. Although the identifications 295 are illustrated only for the configuration data 202 of the leader node 205, the configuration data 202 of each of the compute nodes 210 may include similar identifications. For example, the configuration data 202 can include a list of Internet Protocol (IP) addresses that correspond to the nodes in the distributed database. The leader node may be expressly identified as such or the first IP address in the list can be treated as the leader node by convention, for example. The distributed database management service 120 can generate the configuration data 202 for a distributed database and send it to the leader node 205 which passes the configuration data 202 to the compute nodes 210 or send the configuration data 202 to each of the nodes identified in the configuration data (both leader and compute nodes). As shown, the distributed database includes three compute nodes 210-1 through 210-3.

In some embodiments, the volumes 220 associated with a compute node 210 are divided into a primary partition 220 and a mirror partition 224. A mirrored partition can be used in place of a primary partition in the event of a failure of the volume or compute node associated with the primary partition. As such, the mirror partition associated with a primary partition is located on a different compute node 210 than the primary partition. In an exemplary mirroring scheme, the primary partitions of a volume are mirrored onto the next two compute nodes in the cluster. For example, primary partitions 222-1 and 222-2 are respectively mirrored onto mirror partitions 224-3 and 224-5, primary partitions 222-3 and 222-4 are respectively mirrored onto mirror partitions 224-6 and 224-1, and primary partitions 222-5 and 222-6 are respectively mirrored onto mirror partitions 224-2 and 224-4.

In some embodiments, the volumes 220 are backed up to backup storage 215. The backup storage 215 may be one or more storage devices of the provider network such as an object or block storage device provisioned by the hardware and storage virtualization services 130. The backups may be full backups or partial backups that capture the changes of the database between subsequent backups, sometimes referred to as snapshots. The leader node 205 or compute nodes 210 can be configured to occasionally backup their contents to the backup storage 215.

In operation, the leader node 205 receives a user query directed to the distributed database and, depending on the distribution of data of the distributed database amongst the compute nodes, issues one or more queries or commands to the compute nodes. Upon receiving responses to the issued queries or commands from the compute nodes, the leader node aggregates the responses and, if expected based on the type of user query, responds to the user query.

Topology data 204 defines the distribution of data of the database amongst the compute nodes 210. Slices form the portions of the database by which data is distributed amongst compute nodes. In one embodiment, the leader node 205 distributes the data of a relational database by dividing the tables of the database by row, where a group of rows from one or more of the divided tables form a slice. After division, each row of a table is present in its entirety in one or more slices. The dividing of database table rows into slices can be based on a default or user-specified data distribution style. Exemplary data distribution styles include even distribution (where rows are distributed amongst slices in a round robin manner) and key distribution (where rows that have the same value in a column are placed within the same slice). The use of a key distribution style allows a single compute node 210 to perform table joins (otherwise the results of queries executed on different compute nodes would have to be aggregated and joined in a separate step, for example). The leader node 205 assigns each compute node 210 a certain number of slices. Note that in some embodiments, each row of a table may be present in its entirety in one or more slices. As a result, each row of a table may be present on one or more compute nodes 210. The compute nodes 210 are in turn responsible for running queries from the leader node 205 against the compute nodes' assigned slices. In such a scenario, the topology data 204 includes an identification of which compute nodes 210 are responsible for which slices. In embodiments with mirroring, the topology data 204 includes an identification of the mirror location of a partition. The leader node 205 uses the topology data 204 to determine which compute nodes to query in response to a user query.

Slices 271 through 282 are stored in blocks of data. For example, in a columnar based database, each column of a row is stored separately as one or more blocks of data, and each of the blocks for each column of the row and each row of the slice form the data of the slice. In this simplified illustration, each slice is represented by two blocks having suffixes -1 and -2 (e.g., slice 271 has blocks 271-1 and 271-2). In practice, however, the number of blocks per slice can vary from slice to slice. As indicated above, slices are owned by a compute node and may be divided amongst one or more volumes of the compute node. For example, slice 271 is stored on primary partition 222-1, slice 273 is stored on primary partition 222-2, the blocks of slices 272 and 274 are split between primary partitions 222-1 and 222-2.

Slice metadata 212 tracks the location of the blocks associated with the slice(s) assigned to the compute node. In an exemplary embodiment, each block of a slice has an associated set of metadata that include, for example, an identification of the table, column and slice to which the block belongs. Additionally, the block metadata includes location information for the block. Such location information can include the location of the block in one or more locations. For example, the metadata for a given block may include the location 297 of the block in the locally or network attached storage serving as the volume(s) of the compute node, the location 299 of the block in a mirrored partition (if mirroring is enabled), and the location 298 of the block in the backup storage 215 (if backups are being taken). In this example, since the data of the database assigned to each of the compute nodes 210 is different, the slice metadata 212 varies from compute node to compute node.

To provide robustness to failures during the resize operation, the nodes of the distributed database can implement a versioning control system of configuration data 202, topology data 204, and slice metadata 212. That is, the creation and distribution of updated configuration data 202, topology data 204, and slice metadata 212 as part of a resize operation does not overwrite the configuration data 202, topology data 204, and slice metadata 212 associated with the distributed database before the resize operation was initiated.

Figure 3:
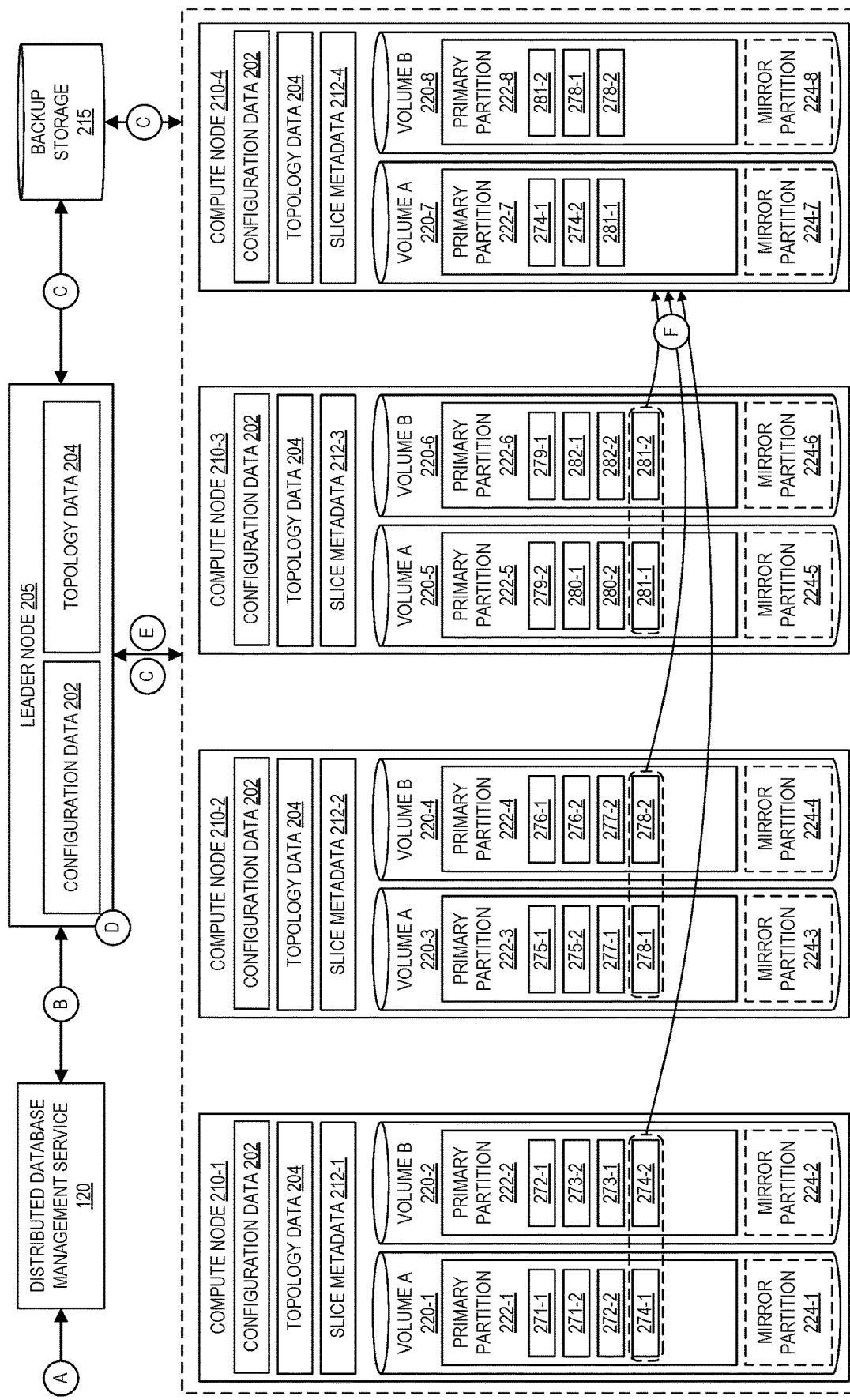
FIG. 3 is a diagram illustrating adding a node to a distributed database according to some embodiments.

FIG. 3 is a diagram illustrating adding a node to a distributed database according to some embodiments. The overall flow illustrated in FIG. 3 is described with reference to the encircled letters A through F. Initially, the configuration of the distributed database is as described above with reference to FIG. 2, including a leader node 205 and three compute nodes 210-1, 210-2, and 210-3. In this example, at circle A, a customer issues a resize request to add a new node to the distributed database. The request can be routed to the distributed database management service 120 via intermediate network(s) 106 and interface(s) 104, as described above. The request can include one or more parameters. For example, the request can include an identifier of the distributed database to be resized and a number of nodes to add or remove from the distributed database. In some embodiments, the parameters of the request are verified against one or more rules to prevent invoking an invalid resize. For example, the distributed database management service 120 can reject a resize request that sought to remove more compute nodes than existed in the identified distributed database. As another example, an attempt to add a number of compute nodes that exceeded a maximum limit would be rejected.

Upon receiving the resize request and, optionally, verifying its validity, the distributed database management service 120 can assign a unique identifier to the resize operation to distinguish the resize operation from other resize operations. The distributed database management service 120 determines that the request is to add a new compute node to the distributed database and requests the launch of a new compute node from, for example, the hardware and storage virtualization services 130. The performance of the allocated compute node may be specified by a parameter of the request or based on a performance associated with the existing compute nodes of the distributed database. The distributed database management service 120 generates an updated configuration for the distributed database, including the identification of the leader node 205, the existing compute nodes 210-1, 210-2, and 210-3, and the newly launched compute node 210-4. The identification of the nodes can be based on each node's assigned IP address. At circle B, the distributed database management service 120 sends the new configuration to the leader node 205, and, optionally, to each of the compute nodes 210. The distributed database management service 120 can also send the unique identifier associated with the resize operation to one or more of the nodes. In some embodiments, the distributed database management service 120 sends the identity of the new node(s) to be added to the distributed database to the leader node 205, and the leader node 205 generates the new configuration data.

Upon receiving or generating the new configuration, the leader node 205 initiates a backup of the distributed database. As indicated at circle C, for example, the leader node 205 can back up its configuration data 202 and topology data 204 to the backup storage 215 and instruct the compute nodes 210-1, 210-2, and 210-3 to backup their respective data, metadata, and slices or blocks to the backup storage 215.

In some embodiments, the leader node 205 can place the distributed database into a read-only mode upon initiating the backup. In doing so, however, users' inability to write to the database can include the period of time during which the data is being backed up. If the previous backup was not recent, that period of time can take several minutes or more. To avoid extending the limited ability to write to the database, the leader node 205 can initiate a first backup while still allowing writes to the database. Upon completion of the first backup, the leader node 205 can place the database in a read-only mode. The leader node 205 can check whether any of the operations during the first backup modified the state of the database (e.g., were write operations) and, if so, initiate a second, incremental backup. Since the leader node 205 initiates the second backup shortly after the first backup completes, the amount of time to perform the second, incremental backup is reduced relative to the first backup, limiting the period of time in which the database is in read-only mode.

At circle D, the leader node 205 generates a data migration plan or information to derive a data migration plan. In some embodiments, the data migration plan directly identifies slices for migration and the compute nodes can locate the data blocks of the slices using the slice metadata 212. In other embodiments, the data migration plan indirectly identifies slices for migration by identifying blocks for migration. Note that the data migration plan preferably operates on slices as atomic units (e.g., does not divide a slice between two compute nodes) to preserve the ability of a single compute node to perform joins without relying on the leader node to aggregate and join query results from multiple compute nodes as described above.

In one embodiment, the leader node 205 generates the data migration plan based on an identification of how many nodes have been added to or removed from the distributed database and a slice migration policy. For example, the leader node 205 can compare the old configuration data with new configuration data or information received from the distributed database management service 120 to identify how many nodes were added or removed. During migration, any added node(s) will serve as data destinations while any removed node(s) will serve as data sources. Such a data migration plan can be specified in terms of deltas in slice assignments amongst the compute nodes. For example, the data migration plan may indicate that slice 274 is removed from compute node 210-1 and added to compute node 210-4. In such a case, the compute nodes can calculate new topology data from the old topology data 204 and the data migration plan.

In another embodiment, the leader node 205 indirectly generates the data migration plan by generating new topology data that represents the state of the data distribution in the distributed database after migration. The nodes can parse the new topology data relative to the old topology data to derive the data migration plan including the changes to the slice assignments.

In addition to identifying nodes that will serve as data sources or data destinations in the data migration, the data migration plan is based on a slice migration policy. One such slice migration policy is a round robin policy where slices are re-assigned from existing nodes to the new node(s) such that new node(s) and existing nodes have approximately the same number of slices. Another such slice migration policy is a best fit policy where, since slices are likely of different sizes, slices are re-assigned from existing nodes to the new node(s) such that new node(s) and existing nodes have approximately the same amount of data (e.g., based on the total number of blocks assigned to each compute node). As yet another example, a slice migration policy can be based on heat management policy where the leader node identifies some subset of frequently accessed slices that are assigned to the same existing compute node for migration to the new node(s).

At circle E, the leader node 205 sends the data migration plan or new topology to each of the compute nodes 210, including the new compute node 210-4.

At circle F, the compute nodes execute the data migration plan. If the data migration plan is indirectly identified based on a new topology, the compute nodes derive the data migration plan based on a comparison of the new topology and the old topology. In this example, the data migration plan indicates the transfer of slices 274, 278, and 281 from compute nodes 210-1, 210-2, and 210-3 to the new compute node 210-4. To avoid the delay associated with copying blocks of data from one compute node to another, the compute nodes can establish communications sessions and transfer slice metadata rather than data blocks. For example, compute nodes 210-1 and 210-4 can establish a communications session. Compute node 210-1 can create new slice metadata based on the old slice metadata 212-1 that no longer references slice 274 and send the portion of the old slice metadata 212-1 that references slice 274 to the compute node 210-4. The compute node 210-4 can append the received slice metadata that references slice 274 to its new slice metadata 212-4.

In some embodiments, the distributed database performs the migration while using the old configuration data 202, topology data 204, and slice metadata 212. As the compute nodes 210 complete aspects of migration, the compute nodes 210 report completion to the leader node 205. The leader node, upon receiving an indication that all of the transfers associated with the migration plan have completed successfully, can issue one or more command to cause the distributed database to switch over operation to using the new versions of the configuration data, topology data, and slice metadata. If the data transfers fail for some reason, the leader node 205 can instruct the compute nodes to continue to use the old versions of the configuration data, topology data, and slice metadata.

In embodiments where slice metadata rather than slice data is transferred during execution of the data migration plan at circle F, the compute nodes 210 can hydrate their volumes with their new slice assignments while continuing to service queries from the leader node 205. For example, the compute nodes may implement a slice hydration policy that dictates the order in which the node fetches blocks associated with their newly assigned slices. To prevent degrading the performance of another compute node of the distributed database that had previously been assigned the slice, the compute nodes can hydrate from the backup storage 215 (e.g., from indications of the location of blocks in the slice metadata). Each node may have a number of threads configured to fetch blocks from the backup storage 215, such as 16, 32, 64, or 128 threads. The hydration policy may sort the priority in which blocks are fetched. Exemplary hydration policies include fetching frequently-used blocks or slices based on historical data (e.g., measured by the leader node and sent to the compute nodes with the data migration plan) or simply fetching blocks in slice and block order without factoring in the past usage. In some embodiments, the compute nodes interrupt the policy-based block fetching to handle queries received from the leader node. For example, the compute node may receive a query that requires access to a block yet to be hydrated. The compute node can pause an existing fetch operation or insert a new fetch operation for the needed block at the front of the queue of blocks to be hydrated and removed the block from its place later in the queue.

Figure 4:
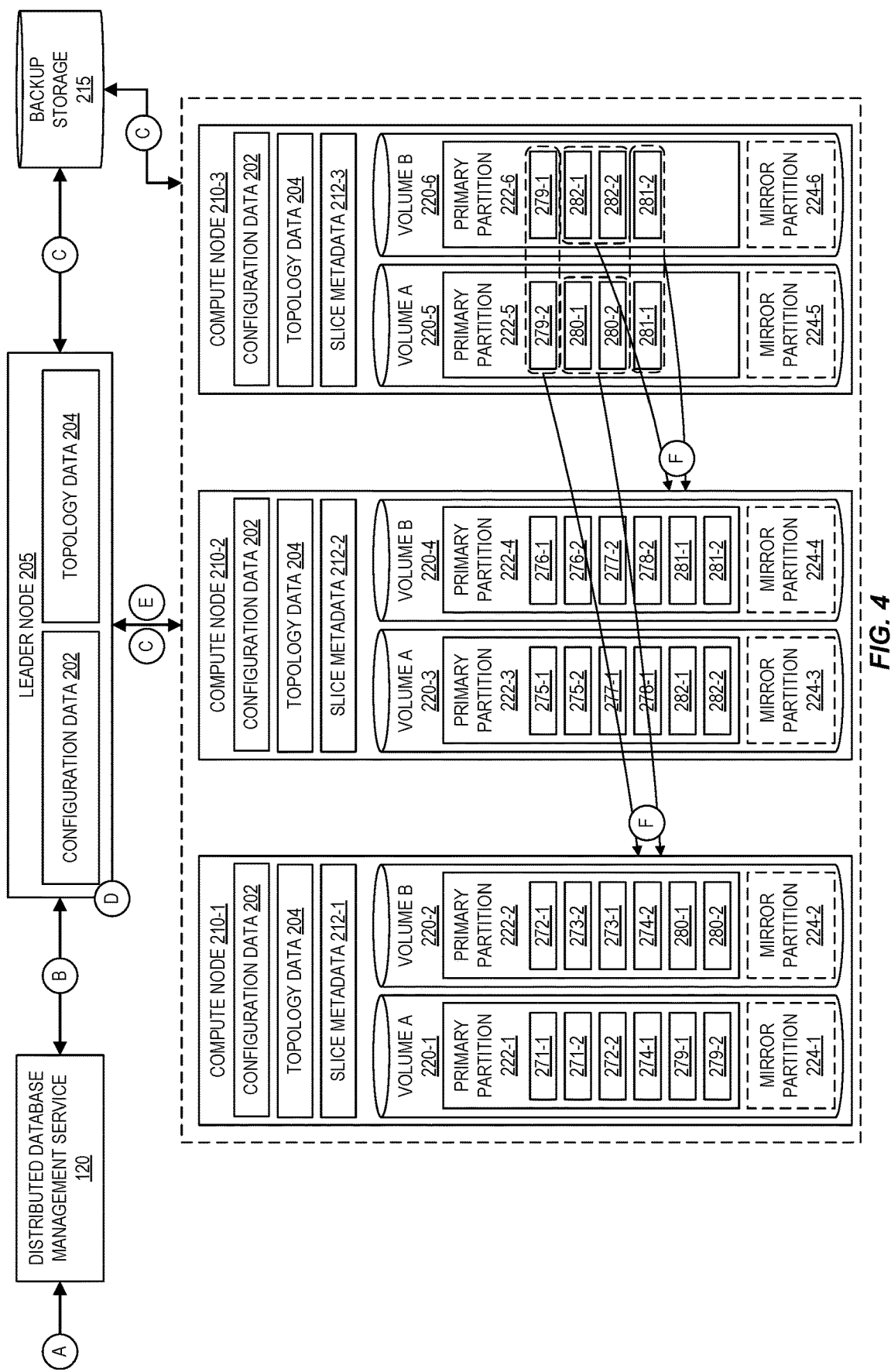
FIG. 4 is a diagram illustrating removing a node from a distributed database according to some embodiments.

FIG. 4 is a diagram illustrating removing a node from a distributed database according to some embodiments. The overall flow illustrated in FIG. 4 is described with reference to the encircled letters A through F. Initially, the configuration of the distributed database is as described above with reference to FIG. 2, including a leader node 205 and three compute nodes 210-1, 210-2, and 210-3. In this example, at circle A, a customer issues a resize request to remove a compute node from the distributed database. The request can be routed to the distributed database management service 120 via intermediate network(s) 106 and interface(s) 104, as described above. The request can include one or more parameters which may be verified, as described above with reference to FIG. 3.

Upon receiving the resize request and, optionally, verifying its validity, the distributed database management service 120 can assign a unique identifier to the resize operation to distinguish the resize operation from other resize operations. The distributed database management service 120 determines that the request is to remove a compute node from the distributed database.

In some embodiments, the distributed database management service 120 can identify one of the compute nodes in the configuration data associated with the distributed database for removal and generate an updated configuration for the distributed database, including the identification of the leader node 205 and the existing compute nodes 210-1 and 210-2 while omitting the compute node to be removed: node 210-3. As above, the identification of the nodes can be based on each node's assigned IP address. At circle B, the distributed database management service 120 sends the new configuration to the leader node 205, and, optionally, to each of the compute nodes 210. The distributed database management service 120 can also send the unique identifier associated with the resize operation to one or more of the nodes. In other embodiments, the distributed database management service 120 sends a resize operation to the leader node 205 including an indication of the number of nodes to be removed from the distributed database. Upon receipt of such an operation, the leader node can select the node(s) to remove from the distributed database based on a node selection policy. Exemplary node selection policies include selecting the nodes with the least amount of data or the fewest number of slices to reduce the amount of data to be migrated, or nodes that have exhibited unexpected behavior such as failing to respond to queries (which may be indicative of a hardware failure). Based on the node selection policy, the leader node 205 generates the new configuration data.

Upon receiving or generating the new configuration, the leader node 205 initiates a backup of the distributed database. As indicated at circle C, for example, the leader node 205 can back up its configuration data 202 and topology data 204 to the backup storage 215 and instruct the compute nodes 210-1, 210-2, and 210-3 to backup their respective data, metadata, and slices or blocks to the backup storage 215. As described above with reference to FIG. 3, the leader node 205 can initiate two back-to-back backups and place the database in a read-only mode when the first backup completes to limit the downtime of the database during the resize operation.

At circle D, the leader node 205 generates a data migration plan or information to derive a data migration plan such as is described above with reference to circle D of FIG. 3.

During node removal, the slice migration policies described above may be adjusted by changing the evaluated parameters. For example, under a round robin slice migration policy, slices are evenly re-assigned from the node(s) being removed to the remaining nodes (e.g., if the node being removed has three slices and there are three remaining nodes, each remaining node is assigned one new slice). Under a best fit policy, slices are re-assigned from nodes being removed to the remaining nodes such that the remaining nodes have comparable amounts of total data assigned after migration. Under a heat management policy, frequently accessed slices on the node being removed are assigned to a remaining node with fewer frequently accessed slices relative to the other remaining nodes.

At circle E, the leader node 205 sends the data migration plan or new topology to each of the compute nodes 210, including the compute node 210-3 being removed.

At circle F, the compute nodes execute the data migration plan. If the data migration plan is indirectly identified based on a new topology, the compute nodes derive the data migration plan based on a comparison of the new topology and the old topology. In this example, the data migration plan indicates the transfer of slices 279 and 280 from compute node 210-3 to compute node 210-1 and slices 281 and 282 from compute node 210-3 to compute node 210-2. To avoid the delay associated with copying blocks of data from one compute node to another, the compute nodes can establish communications sessions and transfer slice metadata rather than data blocks, as described above. For example, compute nodes 210-1 and 210-3 can establish a communications session. Compute node 210-3 can transfer the slice metadata that references blocks of slices 279 and 280 to compute node 210-1, which can append the received metadata to the old slice metadata 212-1 to create new slice metadata.

In some embodiments, the distributed database performs the migration while using the old configuration data 202, topology data 204, and slice metadata 212. As the compute nodes 210 complete aspects of migration, the compute nodes 210 report completion to the leader node 205. The leader node, upon receiving an indication that all of the transfers associated with the migration plan have completed successfully, can issue one or more command to cause the distributed database to switch over operation to using the new versions of the configuration data, topology data, and slice metadata. If the data transfers fail for some reason, the leader node 205 can instruct the compute nodes to continue to use the old versions of the configuration data, topology data, and slice metadata.

In embodiments where slice metadata rather than slice data is transferred during execution of the data migration plan at circle F, the compute nodes 210 can hydrate their volumes with their new slice assignments while continuing to service queries from the leader node 205, as described above.

Once the resize operation to remove compute node 210-3 from the distributed database, the leader node 205 can cause the termination of the removed compute node via, for example, the hardware and storage virtualization services 130.

Figure 5A:
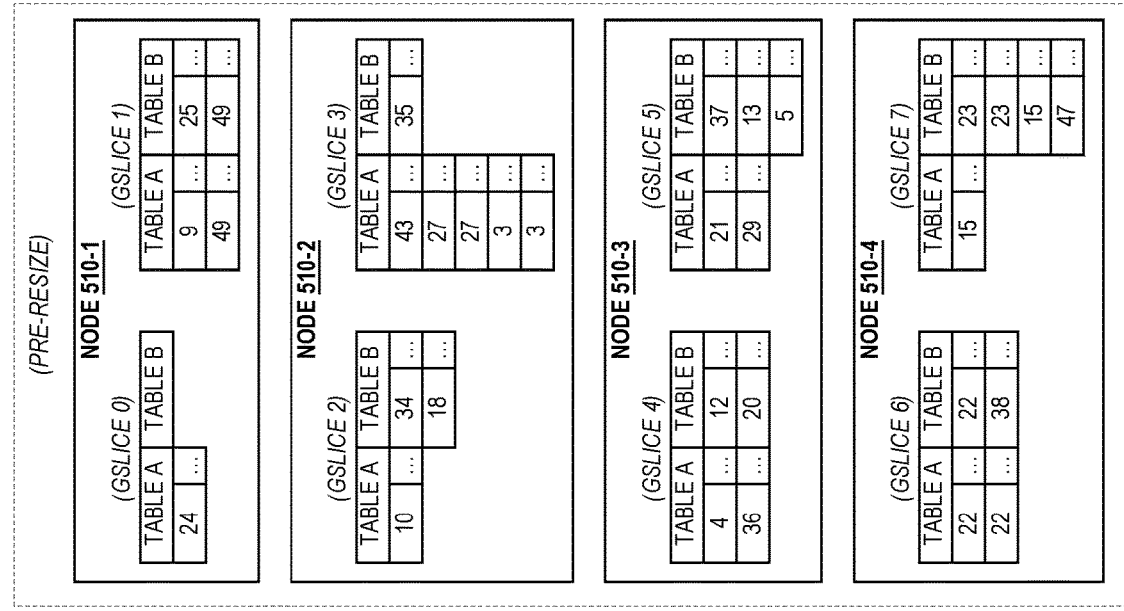
FIGS. 5A and 5B are diagrams illustrating an exemplary slice distribution before and after a resize according to some embodiments.
Figure 5B:
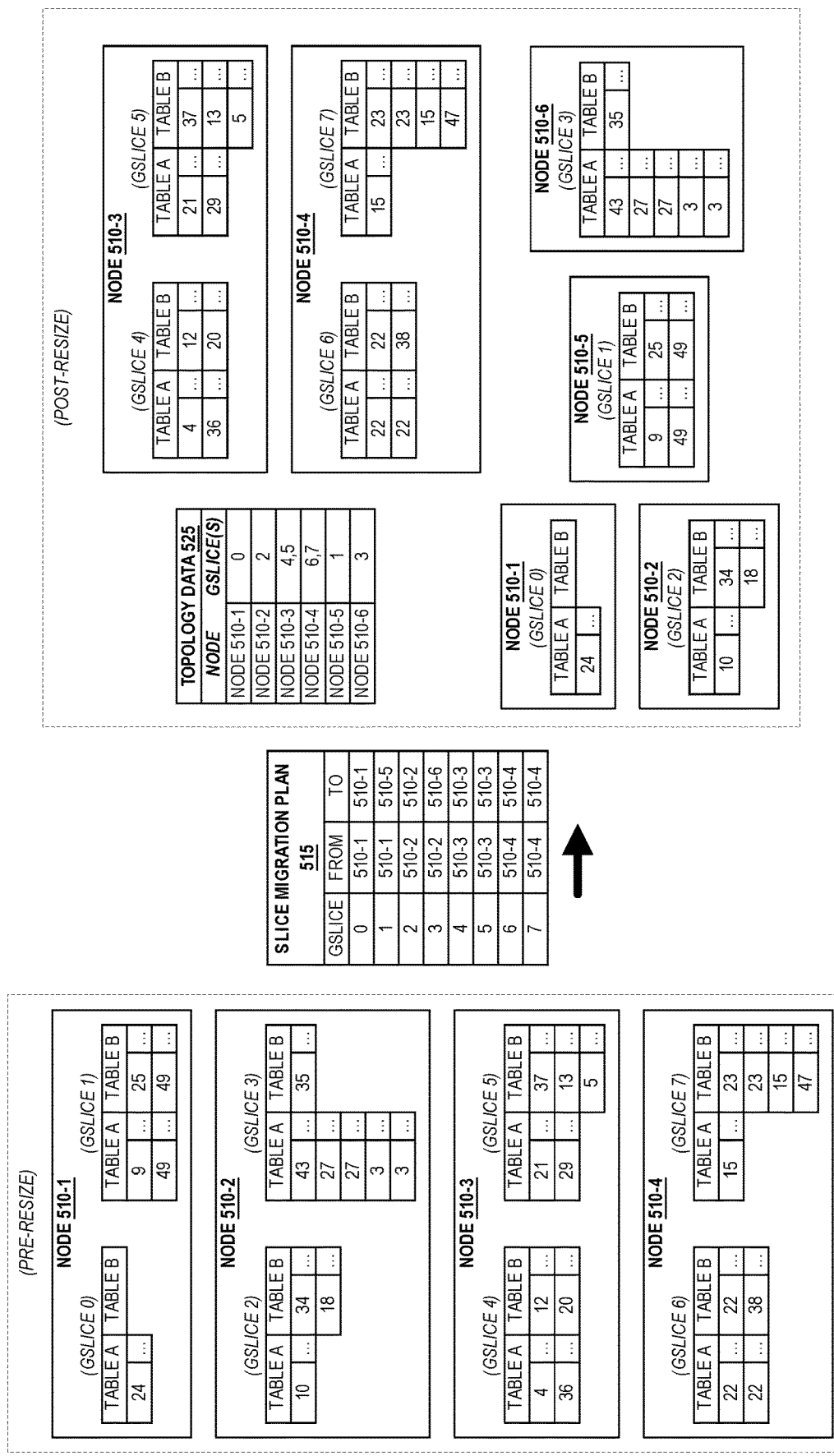

FIGS. 5A and 5B are diagrams illustrating an exemplary slice distribution before and after a resize according to some embodiments. In this example, two tables of a database are illustrated: table A 502 and table B 504. One of the columns in each table is a key 506 that can be used to identify other data 508 in a row, for example. The leader node (not shown) can distribute data amongst the compute nodes 510 based on this key. In this example, the database is divided into eight global slices (enumerated 0-7) which are distributed across four compute nodes 510 at two-slices per compute node. As indicated in the exemplary topology data 507, compute node 510-1 is assigned global slices 0 and 1, compute node 510-2 is assigned global slices 2 and 3, compute node 510-3 is assigned global slices 4 and 5, and compute node 510-4 is assigned global slices 6 and 7.

To generate the initial division of the database, the leader node can apply a hash function to the key 506 in each row of each table to generate a hash value (e.g., to randomly distribute rows of a table). The leader node can then use the hash value to determine which slice will include the row of the table. To simplify this example, assume the hash function outputs the input value (e.g., the hash output of '5' is '5'). As a result, the value of the key 506 of each row of tables 502 and 504 is also the hash value. The leader node can distribute the rows of each table to the global slices by, for example, assigning the row to the global slice that corresponds to the result of the remainder of the hash value divided by the number of global slices (e.g., the global slice is the modulo of the hash value), as is shown in the respective global slice assignments 503, 505 for table A 502 and table B 504. For example, a row with a key value 24 is assigned to global slice 0 (hash of 24 is 24; 24 mod 8 is 0). As another example, a row with a key value 37 is assigned to global slice 5 (hash of 37 is 37; 37 mod 8 is 5). The resulting database distribution is illustrated on the right side of FIG. 5A. As shown, the row of table A 502 with a key value 24 is illustrated within compute node 510-1 based on the global slice assignment of 0, the row of table B 504 with a key value 37 is illustrated within compute node 510-3 based on the global slice assignment of 5, etc. Note that although the row data is illustrated within compute nodes 510, the actual data of the database can be referenced in local- or network-attached storage or in backup storage via slice metadata that identifies blocks that contain the data of a slice as described elsewhere herein.

Note that the global slice is an identifier that refers to the divisions of the database without regard to the distribution of those divisions amongst compute nodes. In some embodiments, each compute node 510 may also locally reference an assigned slice with a local slice number. For example, node 510 1 can refer to global slices 0 and 1 as local slices 0 and 1, node 510-2 can refer to global slices 2 and 3 as local slices 0 and 1, node 510-3 can refer to global slices 4 and 5 as local slices 0 and 1, and node 510-4 can refer to global slices 6 and 7 as local slices 0 and 1.

Turning to FIG. 5B, at some point, a customer issues a resize request to resize the distributed database from four compute nodes to six compute nodes. The left side of FIG. 5B shows the pre-resize distributed database with four compute nodes, 510-1 through 510-4, and the right side shows the post-resize distributed database with an additional two compute nodes, 510-5 and 510-6. The leader node generates a data migration plan to update the assignments of portions of the database amongst compute nodes. In this example, the leader node generates a slice migration plan 515 that migrates data by slice to preserve the ability of compute nodes to perform co-located joins. As shown, the slice migration plan 515 includes migrating global slice 1 from compute node 510-1 to compute node 510-5 and global slice 3 from compute node 510-2 to compute node 510-6. The selection of global slices 1 and 3 is based on a slice migration policy. For example, under the heat-based policy described herein, the leader node could have identified compute nodes 510-1 and 510-2 as sources of slices for migration if compute nodes 510-1 and 510-2 were handling more expensive (e.g., in terms of query frequency, computational requirements, or other metric) queries relative to compute nodes 510-3 and 510-4. The leader node transmits the slice migration plan 515 to each of the compute nodes 510 in the new cluster so that they can begin transferring slice data or metadata as part of the resize operation. Topology data 525 represents the distributed database after the resize operation.

The migration of global slices during resize operations preserves the ability of the distributed database to perform co-located joins of table data within a single compute node. For example, a co-located join of rows with a key value of 49 (global slice 5) in both table A 502 and table B 504 can be performed by compute node 510-1 before the resize operation and by compute node 510-5 after the resize operation, avoiding a need for one of the nodes to fetch data from another node to perform the join (e.g., from one compute node to another compute node, or from multiple compute nodes to the leader node).

Figure 6:
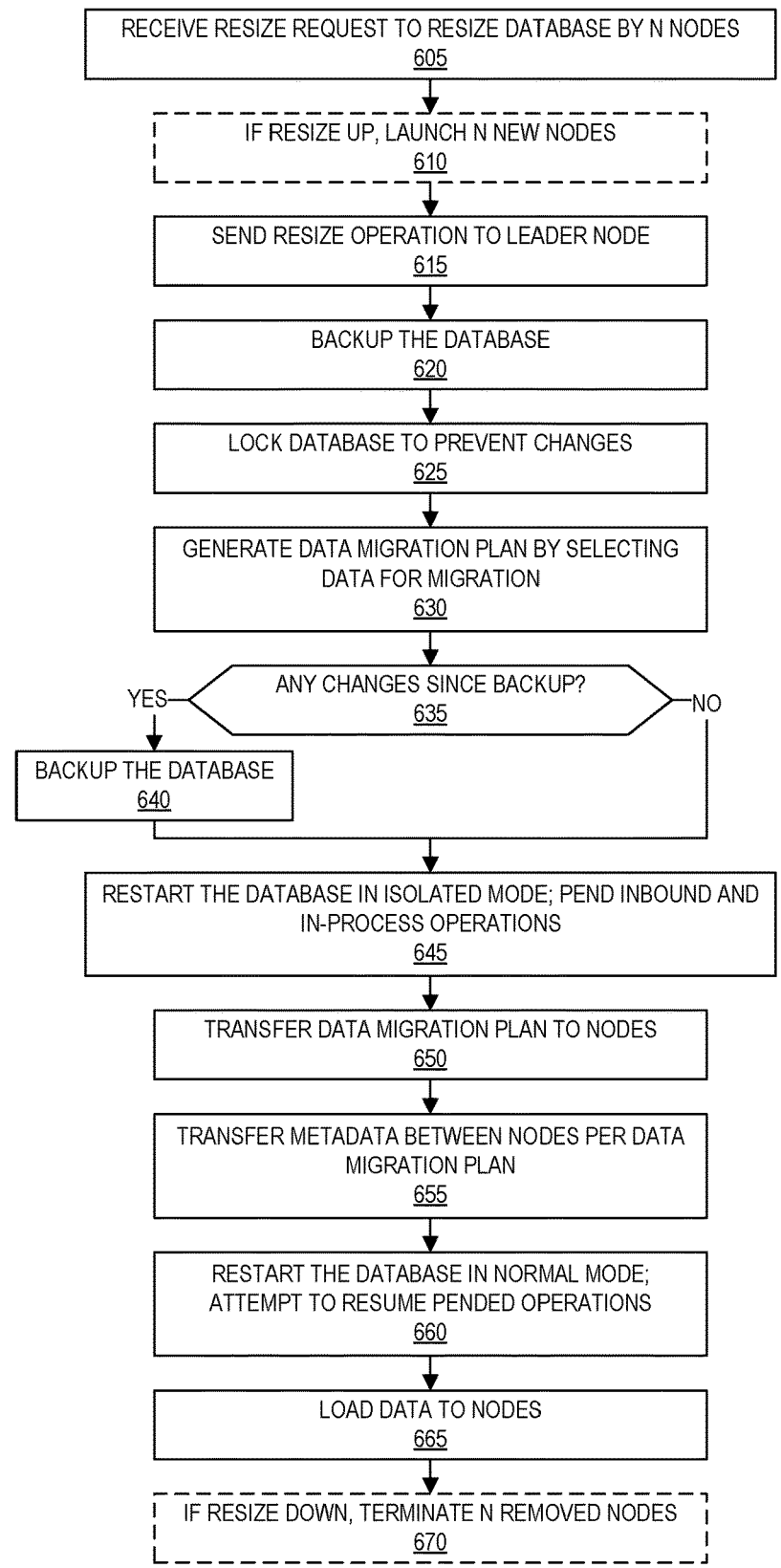
FIG. 6 is a flow diagram illustrating operations of a method for resizing a distributed database according to some embodiments.

FIG. 6 is a flow diagram illustrating operations of a method for resizing a distributed database according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the hardware and storage virtualization services 130, the distributed database management service 120 and/or one or more of the nodes 155, 165, 205, 210 of the other figures.

The operations include, at block 605, receiving a resize request to resize a distributed database by N nodes. For example, a user or customer of the provider may have a distributed database hosted by the provider. The user may access a distributed database management console by, for example, a web browser. The user can submit a request to resize the number of computing nodes across which the database is distributed. In an exemplary distributed database architecture as depicted in FIG. 2, the data of the database is assigned to a plurality of compute nodes 210 and queries directed to the database are coordinate by a leader node 205. The user can increase or reduce the number of compute nodes across which the data of the database is distributed. The request is received by, for example, a distributed database management service 120 that may be considered part of the control plane of the provider network.

The operations include, at block 610, launching N new nodes if the resize operation is to increase the number of compute nodes of the distributed database. As explained elsewhere herein, the provider may leverage virtualization technologies to facilitate hosting the distributed database. If the user requested an increase in the number of nodes across which the database is distributed, the provider provisions new computing resources to host the new node(s).

The operations include, at block 615, sending a resize operation to the leader node of the distributed database to be resized. The leader node coordinates the redistribution of data of the database across the new set of computing resources in some embodiments. The resize operation may indicate the set of computing resources is to grow or shrink in size. In some embodiments, the distributed database management service 120 sends a message to the leader node 205 of a distributed database that includes new configuration data for the database. The configuration data may include a list of the computing resources across which the leader node is to resize the database. The leader node can identify whether there was an increase or decrease in the number of nodes across which to distribute the database by comparing the newly received configuration data against prior configuration data. In some embodiments, the distributed database management service 120 sends a message to the leader node 205 that includes a list of nodes to be added or a number of nodes to be removed. The nodes to be added may be identified in the message or the configuration data by IP addresses, in some embodiments.

The operations include, at block 620, backing up the distributed database. For example, the leader node 205 may initiate a backup of the database to cause the leader node 205 and the compute nodes 210 of the existing database configuration to backup their data to one or more storage devices provisioned for storing backups of the database, such as backup storage 215. Data to be backed up can include configuration data, topology data, slice metadata, and block data. Configuration data can identify the nodes in the distributed database. Topology data can identify the assignment of portions of the database to the various compute nodes 210. For example, a database may be divided into slices, where a slice includes one or more complete rows of one or more tables of the database. The topology data can assign slices to compute nodes 210. The slice metadata can include location information identifying blocks of data that make up a slice within attached storage, in a mirror of the attached storage, if present, and in the backup, if any.

The operations include, at block 625, locking the database to prevent changes to the stored data. In some embodiments, the leader node 205 can restart the database in a read-only mode or cause an inbound query processing engine (not shown) to queue and operations that are received and include the writing or insertion of data into the database.

The operations include, at block 630, generating a data migration plan by selecting data for migration. As described above, the leader node 205 can generate a data migration plan based on the delta between the number of compute nodes in the distributed database before and after resizing and on a slice migration policy, in some embodiments. Exemplary slice migration policies select slices to be moved amongst compute nodes when resizing the cluster. For example, a slice migration policy can select slices that are frequently accessed to be moved from an existing compute node to a new compute node to reduce the load on the existing compute node. As another example, a slice that contains a large portion of the database relative to other slices may be moved from an existing compute node to a new compute node to reduce the size of the portion of the database assigned to the existing compute node. The data migration plan may expressly identify slices to migrate from one compute node to another compute node or may be a new topology that includes new assignments of slices relative to the earlier topology.

The operations include, at block 635, checking whether any changes were made to the database since the backup. In some embodiments, the leader node 205 may have issued one or more operations to compute nodes 210 prior to locking the database at block 625. If such operations included the writing or insertion of data, the leader node 205 can initiate a delta backup or partial snapshot to capture the changes since the earlier backup at block 620, as indicated at block 640.

The operations include, at block 645, restarting the distributed database in an isolated operating mode and, optionally, pending any inbound or in-process operations (e.g., queries). Here, the leader node can restart the distributed database in an isolated state or otherwise block queries. Blocking queries prevents race conditions from arising where the query may implicate a slice that in the process of being reassigned from one compute node to another compute node. To avoid service interruptions, the leader node can buffer inbound queries, such as via the above query processing engine (not shown) to queue and operations that are received. In contrast to the read-only or locked mode at block 625, the isolated mode prevents queries from reaching the compute nodes regardless of whether they are to read or write data.

The operations include, at block 650, transferring the data migration plan to the compute nodes of the distributed database. As described above, the data migration plan may be a new topology or an express identification of changes in data assignments amongst the compute nodes. The leader node 205 transfers the data migration plan to the compute nodes as described above with reference to FIGS. 3 and 4.

The operations include, at block 655, transferring metadata between the nodes based on the data migration plan. As described above, in some embodiments, the compute nodes transfer metadata including the locations of blocks of data to avoid the delay associated with transferring blocks of data themselves.

The operations include, at block 660, restarting the database in a normal operating mode and, optionally, attempting to resume any operations that were pended at block 645. For example, once the metadata transfer is complete and each of the compute nodes has reported a successful transfer of metadata, the leader node 205 can cause each of the nodes of the database to restart in the new configuration and topology to begin servicing queries. Further, any queries that were buffered during the period of time in which the distributed database was operating in an isolated mode can be submitted to the query processing routine of the leader node for analysis and distributed to the compute nodes.

The operations include, at block 665, loading data to nodes. As described above, the attached storage volumes of the compute nodes may be rehydrated with data both in the background through a passive process and through an active process in response to received queries requiring certain blocks of data. Based on any newly assigned slices, the compute nodes can fetch the blocks of data associated with the slices from a location specified in the metadata, such as a backup in the backup storage 215.

The operations include, at block 670, terminating the N old compute nodes that were removed from the distributed database if the resize operation was to decrease the number of compute nodes. As explained elsewhere herein, the provider may leverage virtualization technologies to facilitate hosting the distributed database. When a compute node is removed from the distributed database, the underlying computing resources associated with the hosting of that compute node may be freed for other uses. The leader node 205 can send a message after resizing is complete to cause the hardware and storage virtualization services 130 to terminate the compute instance that was hosting the node.

Figure 7:
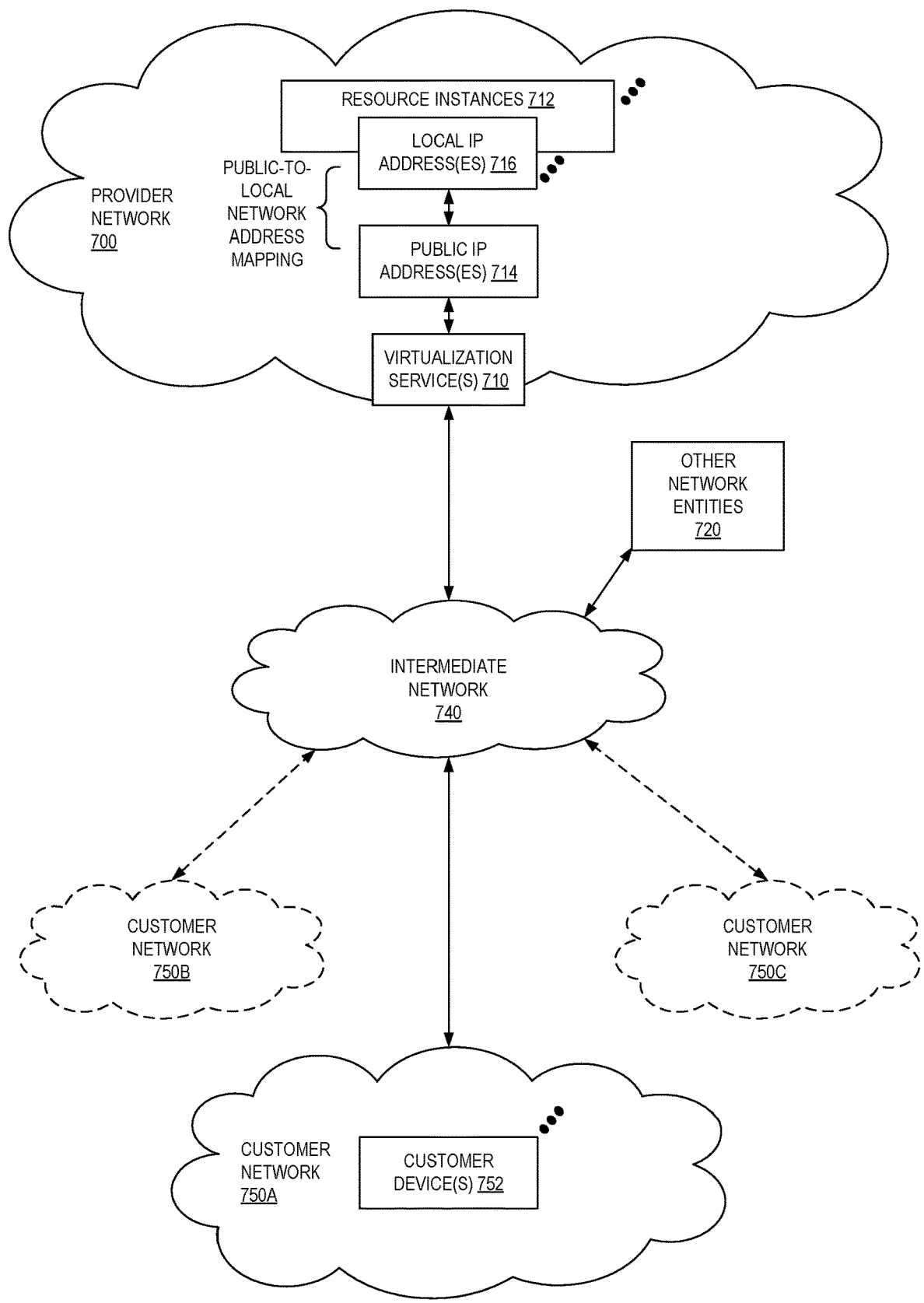
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
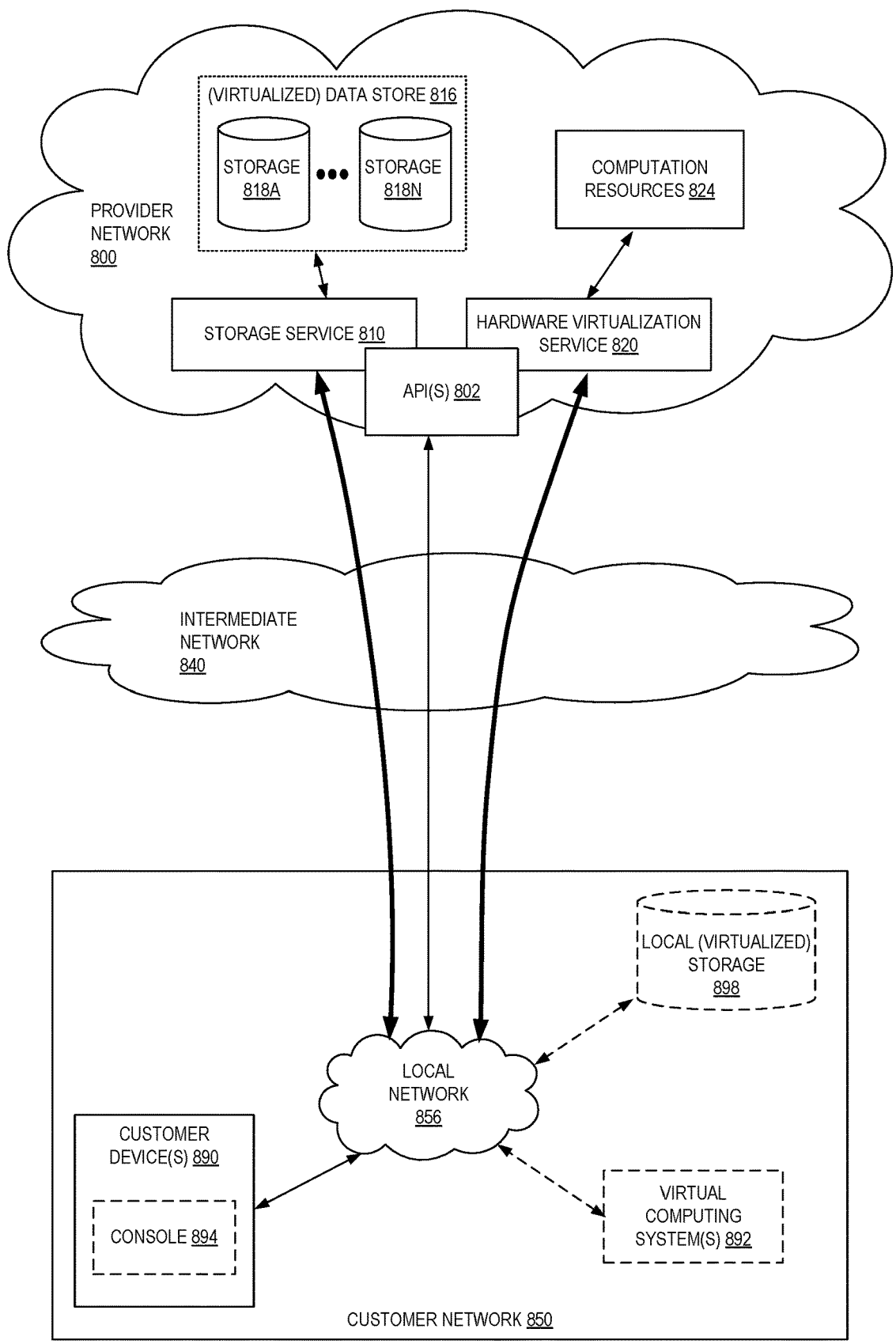
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
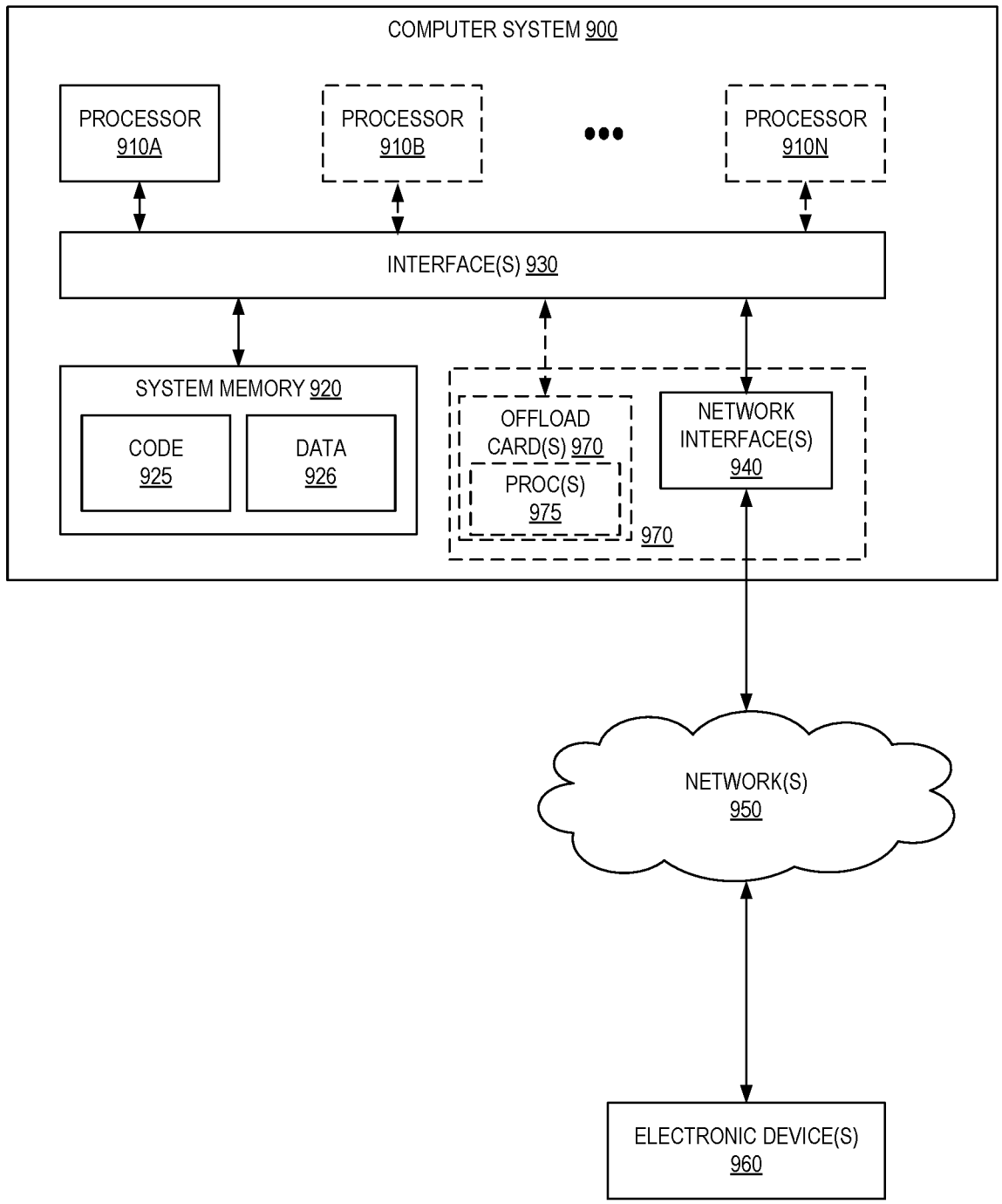
FIG. 9 is a block diagram illustrating an example computer system that may be used in some embodiments.

In some embodiments, a system that implements a portion or all of the techniques for resizing a distributed database as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM) etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to resize a number of a first plurality of nodes that host a distributed database, wherein the distributed database includes a table having a plurality of rows of data, wherein the plurality of rows of data are divided by row amongst a plurality of slices of the distributed database, and wherein each slice of the plurality of slices is assigned to at least one node of the first plurality of nodes;
   selecting a first slice assigned to a first node in the first plurality of nodes to be assigned to a second node in a second plurality of nodes, wherein the number of nodes in the first plurality of nodes is different than a number of nodes in the second plurality of nodes and the first plurality of nodes and the second plurality of nodes include a common node; and
   transferring metadata of the selected first slice from the first node to the second node, wherein the metadata includes a location of data of one or more rows of data associated with the first slice within a provider network.

2. The computer-implemented method of claim 1, wherein each slice of the plurality of slices is associated with a global slice identifier that is independent of a number of nodes that host the distributed database, and wherein each row of the plurality of rows of data includes a key value that corresponds to a global slice identifier of at least one slice in the plurality of slices.

3. The computer-implemented method of claim 1, further comprising sending, by a leader node of the first plurality of nodes, a data migration plan to at least one of the first node or the second node, the data migration plan including an assignment of the selected first slice to the second node, and wherein the first node and the second node transfer the metadata based on the data migration plan.

4. The computer-implemented method of claim 3, further comprising fetching, by the second node in the second plurality of nodes, the data of one or more rows of data associated with the first slice from the location specified in the metadata based on the assignment of the first slice to the second node in the data migration plan.

5. The computer-implemented method of claim 1, further comprising at least one of:
   terminating a computing resource that hosts the first node after transferring the metadata; or
   launching a computing resource to host the second node before transferring the metadata.

6. The computer-implemented method of claim 1, wherein the first plurality of nodes includes a leader node that distributes queries to one or more of the other nodes in the first plurality of nodes, wherein each of the other nodes in the first plurality of nodes is a compute node that executes queries against one or more slices of the plurality of slices assigned to the compute node.

7. The computer-implemented method of claim 1, wherein a first topology associates slices of the plurality of slices with nodes in the first plurality of nodes and a second topology associates slices of the plurality of slices with nodes in the second plurality of nodes.

8. The computer-implemented method of claim 1, further comprising restarting the distributed database in an isolated mode prior to transferring the metadata.

9. The computer-implemented method of claim 8, further comprising:
    restarting the distributed database in a normal mode after transferring the metadata; and
    obtaining a block of data referenced by the metadata from a backup of the database; and
    storing the block of data in a storage volume attached to the second node, wherein the block of data includes a least a portion of a first row of the first slice.

10. The computer-implemented method of claim 1, wherein the second node is the common node.

11. A system comprising:
    a first plurality of compute nodes hosting a distributed database, wherein the distributed database includes a table having a plurality of rows of data, wherein the plurality of rows of data are divided by row amongst a plurality of slices of the distributed database, and wherein each slice of the plurality of slices is assigned to at least one node of the first plurality of nodes, and wherein the first plurality of compute nodes are implemented by a first one or more electronic devices of a provider network; and
    a leader node of the distributed database, wherein the leader node is implemented by a second one or more electronic devices of the provider network, the leader node including instructions that upon execution cause the leader node to:
        receive an indication of a request to resize a number of the plurality of compute nodes that host the distributed database;
        select a first slice assigned to a first compute node in the first plurality of compute nodes to be assigned to a second compute node in a second plurality of compute nodes, wherein a number of compute nodes in the first plurality of compute nodes is different than a number of compute nodes in the second plurality of compute nodes and the first plurality of compute nodes and the second plurality of compute nodes include a common compute node; and
        cause a transfer of metadata of the selected first slice from the first compute node to the second compute node, wherein the metadata includes a location of data of one or more rows of data associated with the first slice within the provider network.

12. The system of claim 11, wherein each slice of the plurality of slices is associated with a global slice identifier that is independent of a number of compute nodes that host the distributed database, and wherein each row of the plurality of rows of data includes a key value that corresponds to a global slice identifier of at least one slice in the plurality of slices.

13. The system of claim 11, wherein the leader node further includes instructions that cause the leader node to send a data migration plan to at least one of the first node or the second node, the data migration plan including an assignment of the first slice to the second compute node, and wherein the first compute node and the second compute node compute transfer the metadata based on the data migration plan.

14. The system of claim 13, wherein the second compute node of the second plurality of compute nodes includes instructions that upon execution cause the second compute to:
    fetch, based on the assignment of the first slice to the second compute node in the data migration plan, the data of one or more rows of data associated with the first slice from the location specified in the metadata.

15. The system of claim 11, wherein the leader node further includes instructions that cause the leader node to cause a termination of a computing resource that hosts the first compute node after the transfer of metadata completes.

16. The system of claim 11, wherein the leader node further includes instructions that cause the leader node to:
    receive a query originated by a user of the provider network; and
    distribute one or more compute node queries based on the received query to one or more of the first plurality of compute nodes, wherein each compute node is to execute a received compute node query against one or more slices of the plurality of slices assigned to the compute node.

17. The system of claim 11, wherein the indication of the request is a new configuration file that identifies the second plurality of compute nodes, and wherein a first topology associates slices of the plurality of slices with nodes in the first plurality of compute nodes and a second topology associates slices of the plurality of slices with nodes in the second plurality of compute nodes.

18. The system of claim 11, wherein the leader node further includes instructions that cause the leader node to restart the distributed database in an isolated mode prior to transferring the metadata.

19. The system of claim 18, wherein the leader node further includes instructions that cause the leader node to restart the distributed database in a normal mode after transferring the metadata, and wherein the second compute node includes instructions that cause the second compute node to:
    obtain a block of data referenced by the metadata from a backup of the distributed database, wherein the block of data includes a least a portion of a first row of the first slice; and
    store the block of data in a storage volume attached to the second compute node.

* * * * *